Patented Aug. 12, 1941

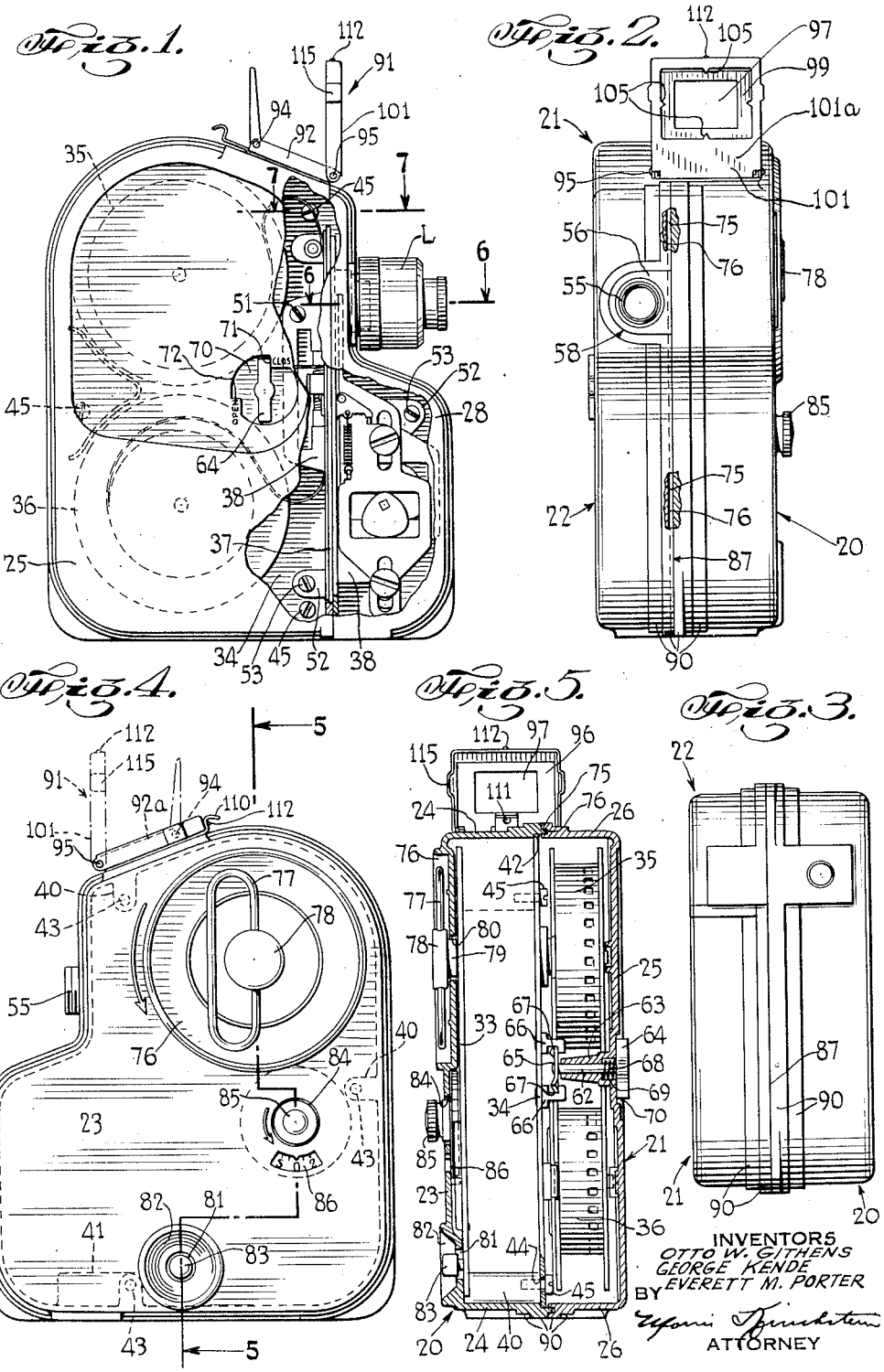

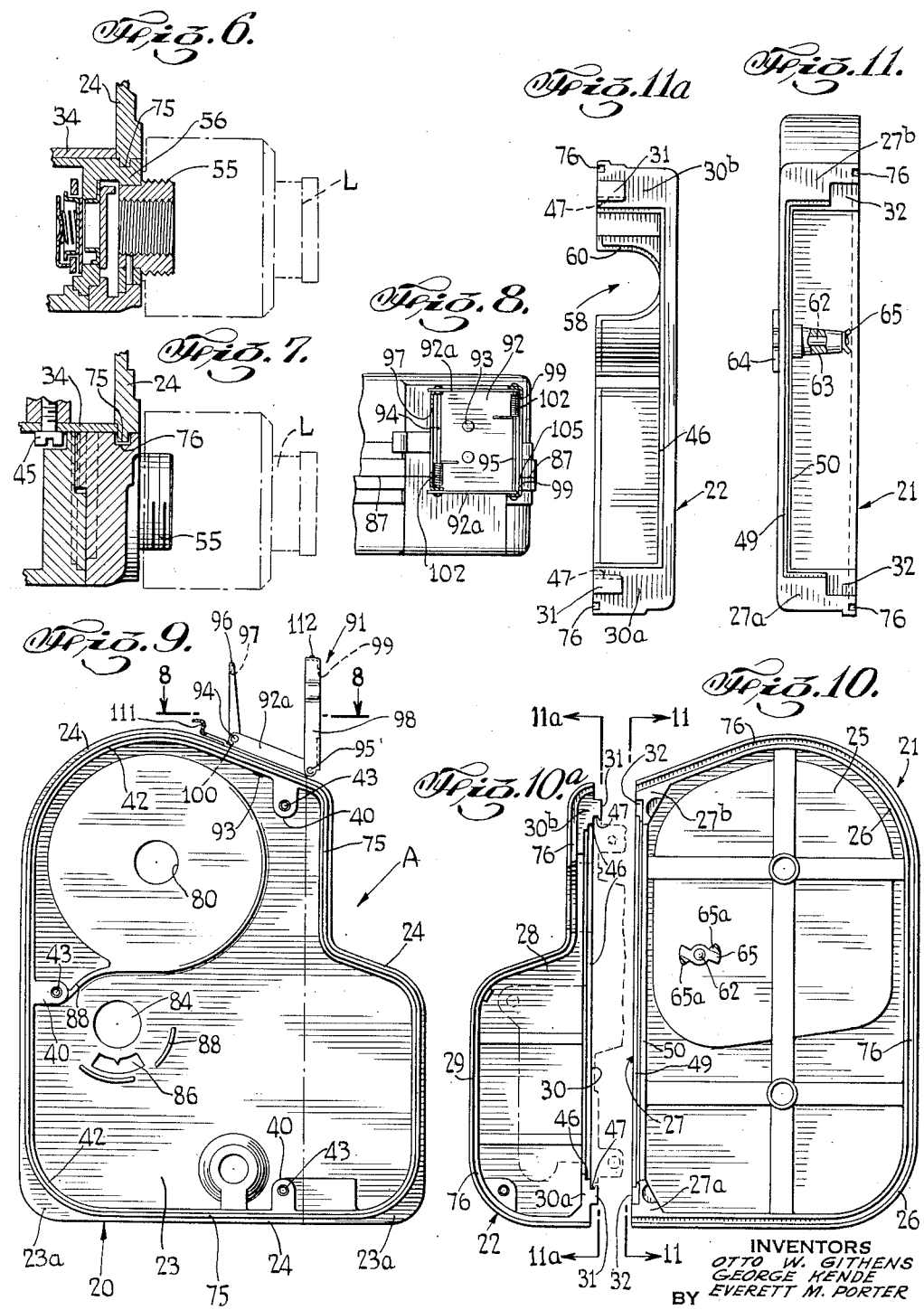

2,252,563

UNITED STATES PATENT OFFICE 2,252,563

MOTION PICTURE CAMERA

Otto W. Githens and George Kende, New York, and Everett M. Porter, Brooklyn, N. Y., assignors, by mesne assignments, to Universal Camera Corporation, New York, N. Y., a corporation of Delaware Application March 3, 1937, Serial No. 128,728

6 Claims. (Cl. 88—17)

This invention relates to motion picture cameras. More particularly, it relates to improvements in the construction of the camera casing and the means for housing the camera mechanisms therein.

One of the objects of our invention is to provide a camera casing construction of the character described, comprising a plurality of parts, in which the parts when assembled form a light proof casing and in which each part is adapted to function as a housing for a camera mechanism unit.

Another object of our invention is to provide a camera construction of the character described, which shall comprise few and simple parts, which shall be easy to assemble, and relatively inexpensive to manufacture, which shall be rugged in construction, neat in appearance and which at the same time shall be highly efficient for the purposes intended.

Still another object of our invention is to provide in a camera casing construction of the character described, comprising a plurality of casing parts, improved means for releasably retaining said parts in assembled relationship.

A still further object of our invention is to provide in cooperation with a camera body construction of the character described an improved finder device.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Certain features shown and described but not claimed in this application are described and claimed in applicants' copending applications, Serial No. 121,488, filed January 21, 1937, now Patent No. 2,167,713, issued August 1, 1939; Serial No. 122,688, filed January 28, 1937, now Patent No. 2,133,743, issued October 18, 1938, and Serial No. 135,410, filed April 7, 1937, now Patent No. 2,174,155, issued Sept. 26, 1939, entitled Improvements in motion picture cameras.

In the accompanying drawings, in which is shown one of the various possible embodiments of this invention, Fig. 1 is an elevational view of one side of a motion picture camera embodying our invention, with a portion of the wall thereof broken away, disclosing the mechanism housed therein, and with the finder in open operative position;

Fig. 2 is a front view of the camera shown in Fig. 1, with the lens removed;

Fig. 3 is a bottom view of the camera shown in Fig. 1;

Fig. 4 is an elevational view of the opposite side of the motion picture camera shown in Fig. 1, but with the lens removed;

Fig. 5 is a cross-sectional view taken substantially on the line 5—5 of Fig. 4;

Fig. 6 is a cross-sectional view taken substantially on the line 6—6 of Fig. 1;

Fig. 7 is a cross-sectional view taken substantially on the line 7—7 of Fig. 1;

Fig. 8 is a cross-sectional view taken substantially on the line 8—8 of Fig. 9;

Figs. 9, 10 and 10a are interior side views of the three separate component parts of the camera casing embodying our invention;

Fig. 11 is a view taken substantially on the line 11—11 of Fig. 10; and

Fig. 11a is a view taken substantially on the line 11a—11a of Fig. 10a.

Referring now in detail to the drawings, there is disclosed a motion picture camera having an improved casing construction comprising three cooperating parts 20, 21 and 22, as clearly shown in Figs. 9, 10 and 10a respectively. The part 20 comprises a bottom wall 23, of substantially a grand piano contour as shown, having an indented portion A, the reason for which will soon become apparent. The wall 23 is provided with an integral upstanding peripheral side wall 24, forming the box-like casing part 20. The part 21 comprises the bottom wall 25 and an integral upstanding side wall 26 adjacent the periphery of 3 sides of said wall 25, to form the box-like casing 21 open at the side 27, with the exception of slight wall portions 27a and 27b. The part 22 comprises the bottom wall 28, and an integral upstanding side wall 29 adjacent the periphery of three sides of the wall 28 to form the box-like casing 22 open at the side 30, except for slight wall portions 30a and 30b.

The parts 21 and 22 are so designed that when fitted together with the edges 27 and 30 adjacent to each other, the said parts 21 and 22 will form a single box-like casing substantially identical in size and contour to that of the part 20, and adapted when the walls 24, 26 and 29 are in contacting and registered relationship to form a hollow camera body substantially the shape of a grand piano, as shown in Fig. 5. To insure proper alignment and registration of the casing parts 21 and 22, there are provided on the wall portions 30a and 30b of the casing part 22, projecting lugs 31 which are adapted to be received in correspondingly shaped recesses 32 in the wall portions 27a and 27b of the casing part 21, to interlock the parts 21 and 22.

Our camera body is so designed that each of the cooperating casing parts 20, 21 and 22 are adapted to house a definite portion of the camera mechanisms. Thus, the part 20 is designed to house therein a unitary mechanism comprising a spring motor for driving the film claw and shutter, the take up spool drive and footage motor, all of which is mounted between two parallel plates 33 and 34 (see Fig. 5), as more clearly shown and described in our copending application Serial No. 135,410, filed April 7, 1937, for Improvements in motion picture cameras.

The casing part 21 is designed to serve as the film spool chamber to house the film take off and film take up spools 35 and 36 (see Figs. 1 and 5), as more fully shown and described in our copending application Serial No. 122,688, filed January 28, 1937 for Motion picture cameras.

The casing part 22 is designed to house the unitary assembly of the film claw and shutter, and actuating means therefor, as well as the film gate and lens mounting, all being supported on an integral die cast frame comprising the walls 37 and 38 (see Figs. 1 and 10a), as clearly shown and fully described in our copending application Serial No. 121,488, filed January 21, 1937 for Motion picture cameras.

For retaining the casing parts 20, 21 and 22 in assembled relationship after the above described mechanisms have been positioned therein, we have provided the following construction: Extending inwardly from the inner surface of the wall 24 of the casing part 20, there are provided a plurality of suitably positioned lugs or bosses 40 (see Fig. 9) which may be integrally cast therewith.

The supporting plate 33 (see Fig. 5) of the mechanism unit hereinbefore described is adapted to overlie the inner surface of the wall 23 of the part 20, and is substantially of the same contour as said casing wall 23. Notches 41 (see Fig. 4) are cut in said plate 33 to register with and receive therein the bosses 40. The supporting plate 34 is parallel to and spaced from the said plate 33 and is of substantially the same contour as the said casing wall 23. The plate 34 is slightly larger than the casing wall 23, and the portion adjacent the periphery thereof adapted to rest upon a recessed shoulder 42 in the side wall 24, said lugs 40 having the top surfaces thereof flush with said shoulder 42 so that the plate 34 will rest thereupon as well as on the shoulder 42. The shoulder 42 and the plate 34 are so designed that when in proper position the top surface of said plate 34 will be substantially flush with the top edge of the casing wall 24. For fastening said mechanism unit contained between the parallel plates 33 and 34 to the casing part 20, threaded holes 43 are provided in the lugs 40, which are adapted to register with apertures 44. Passing through the apertures 44 and received in the holes 43 are suitable screws 45 (see Fig. 1).

The open side 30 of the casing part 22 is provided with a recessed seat 46 (see Figs. 10a and 11a) adjacent the openings thereof and the inner opposed side edges of the lugs 31 are provided with recesses 47 as shown, the said recesses 47 being adapted to slidably receive the reduced opposite ends of the supporting wall 37, while the seat 46 is adapted to receive a corresponding recessed portion of the wall 37, whereby said wall 37 completely closes the open side 30 of the casing part 22. The recessed shoulder 46 is adapted to cooperate with one flat side of the wall 37, while recessed shoulders 49 and 50 adjacent the opening in the side 27 of the casing part 21 are adapted to cooperate with the opposite flat side of the said wall 37 to form a light proof seal dividing the box-like assembled casing parts 21 and 22 into two compartments.

It is noted from Fig. 1 of the drawings that a portion of the wall 38 of the frame supporting the film claw and shutter, etc., as described in our copending application Serial No. 121,488, filed January 21, 1937, extends outwardly from the wall 37 at right angles thereto, said portion being adapted to overlie and rest upon the outer surface of the supporting plate 34. Said portion of the wall 38 is provided with an aperture adapted to register with a threaded hole in the plate 34, and a suitable screw 51 (see Fig. 1) passing through the aperture and received in the said threaded opening in the plate 34, serves to attach the casing part 22, since the wall 37 tends to hold the said casing part captive. For more securely fastening the above described frame and casing part 22 to the casing part 20, there is provided apertured ears 52 (see Fig. 1) on the wall 38 and in the same plane thereof. The said apertures in the ears 52 are adapted to register with threaded holes in the plate 34 of the motor unit and adapted to receive screws 53 similar to the screw 51.

As described in our said copending application Serial No. 121,488, the unitary assembly comprising the wall 37 has also mounted thereon a lens supporting device provided with a threaded shank 55 (see Figs. 6 and 7) and a lens seat 56 adapted to support a lens L. To accommodate this lens supporting device, the wall 29 of the casing part 22 is provided with a notch 58 (see Fig. 11a) corresponding in contour to the lens seat portion 56 and adapted to receive the said seat 56 therein so that the outer surface thereof is substantially flush with the outer surface of the casing wall 29, and with the threaded shank 55 projecting beyond the outer surface of the casing wall 29 and into the indented area A of the camera body, hereinbefore mentioned, so that when the lens L is screwed to the shank 55, it will be contained within the said area A and will not project beyond the body of the camera. Thus, the lens will be protected against damage and at the same time provide a neat design for the camera, as clearly shown in Fig. 1.

To prevent light from entering the box-like casing part 22 through the notch 58, the said notch is provided adjacent the open edge thereof with a recessed shoulder 60, into which there is received the correspondingly recessed shoulder 61 surrounding the lens seat 56.

In order to complete the assembly of the camera body, there remains now to be attached, the casing part 21, interlocked with the casing part 22, as hereinbefore described. To this end, we have provided, as shown in Figs. 5, 10 and 11, a shaft 62 rotatably and non-slidably mounted in a bearing 63 on the inner surface of the wall 25 of the casing part 21. The wall 25 is provided with an aperture through which the shaft 62 extends, said shaft being provided at the end thereof with an enlarged head 64 portion adapted to serve as a handle to facilitate the rotation of said shaft. At the opposite end of the shaft there is provided a cam member 65, for rotation with the shaft 62, designed to cooperate with a pair of spaced lugs 66 extending upwardly from the plate 34. The lugs 66 are provided with a pair of opposed aligned notches 67 adapted to receive therein the cammed ends 66a of the cam member 65 upon rotation of the shaft 62. The member 65 may be frictionally retained in locked position within the notches 67 by means of a spring 68 surrounding a portion of the shaft 62 and housed in an opening 69 in the bearing 63, as shown in Fig. 5. The handle 64 may be designed to operate in a recess 70 in the outer surface of the wall 25 of the casing part 21 (see Fig. 1), said recessed area 70 being provided with abutment portions 71 and 72 to limit the amount and direction of rotation of the shaft 62. Suitable markings may be provided to indicate the open and closed positions of the locking mechanism just described.

It is thus seen that by our invention we have provided an improved construction, whereby the camera body may be easily and quickly assembled and in which a portion of the casing serving as a film spool chamber is releasably locked to the camera body, for the quick removal and replacement thereof, for the purpose of withdrawing and replenishing the supply of rolled film. To render the camera light proof, there is provided the following construction: The top edge of the casing side wall 24 of the part 20 is provided with an upwardly projecting ridge 75 (see Figs. 5, 6, 7 and 9) which is adapted to register with and fit into a sunken channel 76 on the top edge of the casing walls 26 and 29 of the interlocked casing parts 21 and 22 (see Figs. 6, 7, 10, 10a, 11 and 11a).

A portion of the wall 23 of the casing part 20 may be pressed inwardly to form a recessed area 76, designed to receive therein a bail handle 77 (see Figs. 4 and 5) attached to a hub 78, having a reduced diameter portion 79 received in an aperture 80 in the wall 23, the hub 78 being designed to be screwed to a spring shaft for winding the spring motor, as fully shown and described in my said copending application Serial No. 135,410, filed April 7, 1937.

A suitable aperture 81 surrounded by a recessed portion 82 in the wall 23 may be provided to accommodate a motor starting pin 83, also an aperture 84 is provided to accommodate a knurled nut 85, and an aperture 86 serving as a window for the footage meter. The mechanisms for which the apertures 81, 84 and 85 are designed are fully shown and described in our said copending application Serial No. 135,410, filed April 7, 1937.

To prevent light from entering the apertures 84 and 86, there may be provided a number of ridges 88 (see Fig. 9) on the inner surface of the wall 23 to hold a colored transparent disc of Celluloid or similar material (not shown) and adapted to keep out harmful light rays.

If desired, a series of decorative stepped ridges 90 (see Figs. 2, 3 and 5) may be provided adjacent the junction line 87 of the casing port 20 with the parts 21 and 22.

If desired, a pair of corner flanges 23a on the casing wall 24 may be provided (see Fig. 9) to facilitate the mounting of the camera on a base, such as for example, that shown and described in the copending application Serial No. 115,909, filed December 15, 1936, for Cameras, now Patent No. 2,172,348, issued Sept. 12, 1939.

Attached to the exterior wall of one of the casing parts, such as for example, the part 20, we have provided an improved finder device 91 shown in open, operative position in Figs. 1, 2, 4, 5, 8 and 9. The finder 91 comprises a base plate 92 permanently attached to the casing wall 24 by any suitable fastening means, such as rivets 93. The plate 92 is provided with a pair of opposed upturned edges 92a provided with two spaced pairs of aligned apertures, having received therein a pair of parallel shafts 94 and 95. Pivotally mounted on the shaft 94 is a frame 96 having an aperture 97 therein, while pivotally mounted on the shaft 95 is a frame 98 provided with an aperture 99 adapted to be in axial alignment with and larger than the aperture 97. Means such as abutment portions 100 are provided for limiting the outward pivotal movement of the frame 96, and similar abutment means 101 on the frame 98 limit the outward pivotal movement of the frame 98. It is noted the frames 96 and 98 are adapted to pivotally move outwardly in opposite directions until the abutments 100 and 101 strike the edge of the plate 92.

The above described mechanism is so designed that when the frames 96 and 98 are swung outwardly to the above described limits, they will be substantially vertical and parallel to each other, as shown. Resilient means, such as springs 102 on the shaft 94 and 95 are provided for normally urging the frames 96 and 98 to the above described upright position. To facilitate the proper alignment, and at the same time to obtain an unobstructed view of the picture to be taken, there are provided the four points 105 on the frame 98 projecting slightly inwardly of the aperture 99, one point 105 being positioned in the center of each of four walls adjacent the aperture 99.

For effectively operating the above described finder, the camera operator looking through the aperture 97 in the frame 96 at a picture to be taken, centrally align said aperture 97 with the aperture 96 in the frame 98, by means of the points 105.

The above described finder 91 is so designed that when not in use it can be collapsed to lie flat on the casing wall 24. To this end, the frame 96 is made of such size that it will fit in between the sides 92a and to overlie the plate 92, while the frame 98 is provided with the three surrounding walls 98a which are of sufficient size to fit outside of the sides 92a. When the frames 96 and 98 are swung inwardly against the action of the springs 102, the frame 96 will be nested between the sides 92a of the plate 92, and the frame 98 will telescope over the nested assembly of the frame 96 and plate 92, the whole assembly being adapted to lie flat against the casing wall 24. The finder may be releasably retained in collapsed position by means of a resilient trigger member 110, having an aperture 111 therein, designed to receive a pin projection 112 on the top frame wall 98a, the frame 96 being held by a portion 101a of the frame 98. When it is desired to bring the finder into open operative position, it is merely necessary to press downwardly on the trigger 110, which will release the projection 112 from the aperture 111 and the frames 96 and 98 will automatically swing to upright position by the action of the springs 102.

The two opposite walls of the frame 98 may be provided with pressed out portions 115, to clear the rivet heads of the shafts 94 and 95 when the said frame 98 is folded to closed position.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. A camera casing comprising three cooperating parts, each of said parts having bottom walls, the first of said parts having an upstanding continuous peripheral side wall forming a box-like member, the second and third of said parts being provided with upstanding side walls extending around the periphery of all but a portion of one edge of the bottom walls thereof, leaving one side of said second and third parts open, said open sides being parallel to each other and adapted to be contiguously disposed to form a second box-like member having a continuous peripheral side wall similar to the side wall of said first part, and a ridge surrounding each of said open sides, spaced from the periphery thereof and adapted to define a groove between said ridges when said second and third parts are in assembled relationship, said groove being adapted to receive therein a wall of a mechanism supporting frame, having a corresponding ridge adapted to fit in said groove to form a light seal at the junction of said second and third parts.

2. A camera having a casing comprising three separable cooperating parts, each of said parts having bottom walls, the first of said parts having an upstanding continuous peripheral side wall forming a box-like member, the second and third of said parts being provided with upstanding side walls extending around the periphery of all but one edge of the bottom walls thereof, leaving one side of said second and third parts open, said open sides being parallel to each other and adapted to be contiguously disposed to form a second box-like member, having a continuous peripheral side wall, means associated with said first part for housing a motor unit having a flat plate, said last named means comprising a plurality of lugs on the inner surface of the said side wall adapted to support said plate thereon, and means associated with said plate for releasably locking said contiguously disposed second and third casing parts in assembled relationship with said first casing part.

3. A camera having a casing comprising three separable cooperating parts, each of said parts having bottom walls, the first of said parts having an upstanding continuous peripheral side wall forming a box-like member, the second and third of said parts being provided with upstanding side walls extending around the periphery of all but one edge of the bottom walls thereof, leaving one side of said second and third parts open, said open sides being parallel to each other and adapted to be contiguously disposed to form a second box-like member, having a continuous peripheral side wall similar to the side wall of said first part, means associated with said first part for housing a motor unit having a flat plate, said last named means comprising a plurality of lugs on the inner surface of the said side wall, adapted to support said plate thereon, said lugs being provided with threaded openings adapted to receive screws therein to fasten said plate to said first part, and means associated with said plate for releasably locking said contiguously disposed second and third casing parts in assembled relationship with said first casing part.

4. A camera casing comprising three cooperating parts, each of said parts having bottom walls, the first of said parts having an upstanding continuous peripheral side wall forming a box-like member, the second and third of said parts being provided with upstanding side walls extending around the periphery of all but one edge of the bottom walls thereof, leaving one side of said second and third parts open, said open sides being parallel to each other and adapted to be contiguously disposed to form a second box-like member, having a continuous peripheral side wall similar to the side wall of said first part, means associated with said first part for housing a motor unit having a flat plate, said last named means comprising a plurality of lugs on the inner surface of the said side wall, adapted to support said plate thereon, said lugs being provided with threaded openings adapted to receive screws therein to fasten said plate to said first part, a ridge surrounding the said open sides of said second and third parts, spaced from the periphery thereof and adapted to define a groove between said ridges when said second and third parts are in assembled relationship, said groove being adapted to receive therein a wall of a mechanism supporting frame having a corresponding ridge to form a light seal at the junction of said second and third parts, said second part being adapted to house therein a film claw and shutter unit mounted on said supporting frame, said frame being adapted to be attached to said flat plate of said motor unit.

5. A camera casing comprising three cooperating parts, each of said parts having bottom walls, the first of said parts having an upstanding continuous peripheral side wall forming a box-like member, the second and third of said parts being provided with upstanding side walls extending around the periphery of all but one edge of the bottom walls thereof, leaving one side of said second and third parts open, said open sides being parallel to each other and adapted to be contiguously disposed to form a second box-like member, having a continuous peripheral side wall similar to the side wall of said first part, means associated with said first part for housing a motor unit having a flat plate, said last named means comprising a plurality of lugs on the inner surface of the said side wall adapted to support said flat plate thereon, said lugs being provided with threaded openings adapted to receive screws therein to fasten said plate to said first part, a ridge surrounding said open sides of said second and third parts, spaced from the periphery thereof and adapted to define a groove between said ridges when said second and third parts are in assembled relationship, said groove being adapted to receive therein a wall of a mechanism supporting frame having a corresponding ridge to form a light seal at the junction of said second and third parts, said second part being adapted to house therein a film claw and shutter unit mounted on said supporting frame, said frame being adapted to be attached to said flat plate, said third part and said flat plate being adapted to define a film spool chamber, and means on said third part cooperating with means on said flat plate for releasably retaining said third part in assembled relationship with said first and second parts.

6. A camera casing comprising three cooperating parts, each of said parts having bottom walls, the first of said parts having an upstanding continuous peripheral side wall forming a box-like member, the second and third of said parts being provided with upstanding side walls extending around the periphery of all but one edge of the bottom walls thereof, leaving one side of said second and third parts open, said open sides being parallel to each other and adapted to be contiguously disposed to form a second box-like member, having a continuous peripheral side wall similar to the side wall of said first part, means associated with said first part for housing a motor unit having a flat plate, said last named means comprising a plurality of lugs on the inner surface of the said first part side wall adapted to support said plate thereon, said lugs being provided with threaded openings adapted to receive screws therein to fasten said flat plate to said first part, a ridge surrounding said open sides of said second and third parts, spaced from the periphery thereof and adapted to define a groove between said ridges when said second and third parts are in assembled relationship, said groove being adapted to receive therein a wall of a mechanism supporting frame to form a light seal at the junction of said second and third parts, said second part being adapted to house therein a combination film claw and shutter unit mounted on said supporting frame, said frame being adapted to be attached to said third part and said flat plate being adapted to define a film spool chamber, and means on said third part cooperating with means on said flat plate for releasably retaining said third part in assembled relationship with said first and second parts, said releasable retaining means comprising a rotatably mounted shaft on the bottom wall of said third part, extending inwardly thereof and provided with a cam member rotatably therewith.

OTTO W. GITHENS.
GEORGE KENDE.
EVERETT M. PORTER.